(12) United States Patent
Juhola et al.

(10) Patent No.: US 12,367,846 B1
(45) Date of Patent: Jul. 22, 2025

(54) PIXEL LAYOUT FOR LENTICULAR AUTOSTEREOSCOPIC DISPLAY

(71) Applicant: Distance Technologies Oy, Helsinki (FI)

(72) Inventors: Mikko Juhola, Muurla (FI); Martin Schüle, Espoo (FI); Petri Savolainen, Espoo (FI)

(73) Assignee: Distance Technologies Oy, Helsinki (FI)

( * ) Notice: Subject to any disclaimer, the term of this patent is extended or adjusted under 35 U.S.C. 154(b) by 0 days.

(21) Appl. No.: 19/175,652

(22) Filed: Apr. 10, 2025

(51) Int. Cl.
| | | |
|---|---|---|
| G09G 3/00 | (2006.01) | |
| G02B 30/27 | (2020.01) | |
| G06F 3/01 | (2006.01) | |
| G09G 3/36 | (2006.01) | |
| G02F 1/1335 | (2006.01) | |

(52) U.S. Cl.
CPC ........... *G09G 3/3607* (2013.01); *G02B 30/27* (2020.01); *G06F 3/013* (2013.01); *G09G 3/003* (2013.01); *G02F 1/133526* (2013.01); *G09G 2300/0452* (2013.01); *G09G 2320/0242* (2013.01); *G09G 2354/00* (2013.01)

(58) Field of Classification Search
None
See application file for complete search history.

(56) References Cited

U.S. PATENT DOCUMENTS

| | | | | |
|---|---|---|---|---|
| 6,464,359 | B1 * | 10/2002 | Owen | H04N 9/3117 |
| | | | | 353/38 |
| 9,554,124 | B1 * | 1/2017 | Owurowa | G02B 30/33 |
| 12,196,960 | B1 * | 1/2025 | Konttori | G02B 27/0101 |
| 12,260,506 | B1 * | 3/2025 | Strandborg | G06F 3/013 |
| 2012/0038693 | A1 * | 2/2012 | Kang | H04N 9/3117 |
| | | | | 353/31 |
| 2013/0286053 | A1 * | 10/2013 | Fleck | G09G 5/377 |
| | | | | 345/82 |
| 2014/0002897 | A1 * | 1/2014 | Krijn | G02B 30/27 |
| | | | | 359/463 |
| 2014/0192285 | A1 * | 7/2014 | Shinkai | G02B 30/25 |
| | | | | 362/225 |
| 2018/0152689 | A1 * | 5/2018 | Lee | G02B 30/27 |
| 2019/0149808 | A1 * | 5/2019 | Ng | H04N 13/327 |
| | | | | 348/59 |
| 2022/0102583 | A1 * | 3/2022 | Baumheinrich | G02B 6/12007 |

\* cited by examiner

*Primary Examiner* — Parul H Gupta
(74) *Attorney, Agent, or Firm* — ZIEGLER IP LAW GROUP, LLC.

(57) ABSTRACT

A display device includes a light-emitting panel comprising a plurality of pixels, wherein a given pixel comprises sub-pixels of at least two different colours (R, G, B, W) that are arranged sequentially along a first direction (A-B, H-I, M-N, K-L, Y-Z, U-V). The display device further includes a lenticular array arranged on an optical path of the light-emitting panel, the lenticular array including a plurality of lenticular lenses, wherein a longitudinal axis (X-Y) of a given lenticular lens aligns with the first direction. A processor is configured to generate drive signals for the plurality of pixels, based on a light field image to be displayed and to drive the plurality of pixels using the drive signals to display the light field image.

14 Claims, 5 Drawing Sheets

PIXEL LAYOUT FOR LENTICULAR AUTOSTEREOSCOPIC DISPLAY

TECHNICAL FIELD

The present disclosure relates to display devices comprising a lenticular array for autostereoscopic display. The present disclosure also relates to systems for displaying images by using such display devices.

BACKGROUND

Lenticular-based three-dimensional (3D) display systems enable stereoscopic visualization without requiring use of special eyewear. Such display systems incorporate lenticular lenses to project distinct images to each eye of a user, facilitating perception of depth. Further, resolution and colour accuracy of displayed images in such display systems are critical for maintaining high-quality visual output. However, conventional lenticular 3D display systems are associated with multiple limitations, including suboptimal pixel arrangements that introduce colour aberrations and resolution imbalances.

Conventional liquid crystal display (LCD) panels used in lenticular 3D display systems typically incorporate three adjacent red, green and blue (RGB) subpixels arranged side by side to form pixels. Consequently, when such LCD panels are used in lenticular 3D display systems, each lenticular lens covers multiple pixels, requiring specific pixel arrangements to achieve a stereoscopic effect. However, such pixel arrangements result in horizontal resolution limitations due to required grouping of pixels under each lenticular lens. Additionally, due to the linear arrangement of RGB subpixels, chromatic aberrations arise because the magnification of the lenticular lenses occurs predominantly along one axis, which affects colour uniformity across different viewing angles.

Further, conventional lenticular 3D display systems exhibit low brightness due to the use of colour filter arrays comprising distinct red, green and blue filters. Since white light from a backlight source must pass through these filters to produce individual colours, a significant portion of light is absorbed, leading to reduced brightness. Such a reduction in brightness hinders the perception of fine visual details, reduces colour accuracy and contributes to visual fatigue during prolonged usage. Additionally, conventional pixel arrangements in lenticular 3D display systems underutilize vertical resolution, as the horizontal-to-vertical resolution ratio remains imbalanced, leading to unnecessary computational loads and inefficient use of display resources.

Therefore, in light of the foregoing discussion, there exists a need to overcome the aforementioned problems.

SUMMARY

The present disclosure seeks to provide a display device and a system for displaying high-resolution images in a lenticular three-dimensional (3D) display system. The aim of the present disclosure is achieved by a display device employing an optimized liquid-crystal display (LCD) pixel layout configured to reduce colour aberrations and improve brightness by utilizing a specific arrangement of colour filters and sub-pixels in relation to lenticular lenses. The system employs such a display device to enable an enhanced 3D viewing experience by aligning pixel structures with lenticular optics, facilitating improved resolution and reduced colour distortions, as defined in the appended independent claims to which reference is made to. Advantageous features are set out in the appended dependent claims.

Throughout the description and claims of this specification, the words "comprise", "include", "have" and "contain" and variations of these words, for example "comprising" and "comprises", mean "including but not limited to" and do not exclude other components, items, integers or steps not explicitly disclosed also to be present. Moreover, the singular encompasses the plural unless the context otherwise requires. In particular, where the indefinite article is used, the specification is to be understood as contemplating plurality as well as singularity, unless the context requires otherwise.

DETAILED DESCRIPTION OF EMBODIMENTS

Figure 1:
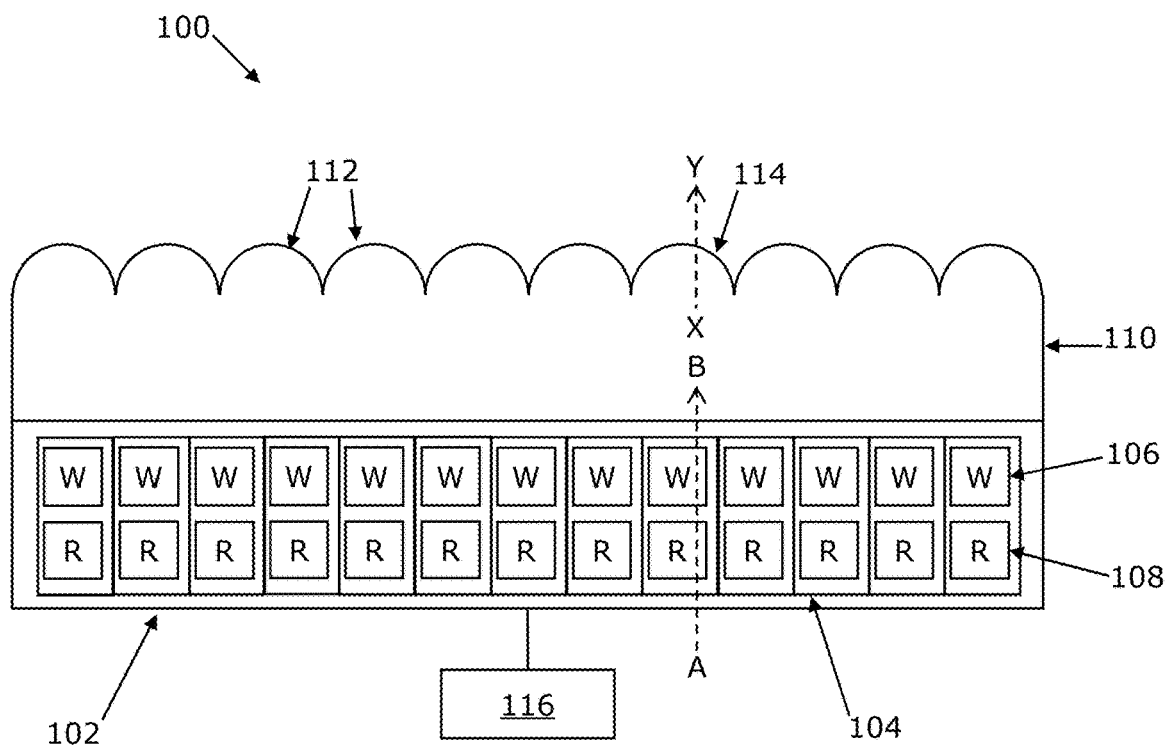
FIG. 1 is a simplified top view of a display device, in accordance with an embodiment of the present disclosure.

The following detailed description illustrates embodiments of the present disclosure and ways in which they is implemented. Although some modes of carrying out the present disclosure have been disclosed, those skilled in the art would recognize that other embodiments for carrying out or practising the present disclosure are also possible.

In a first aspect, the present disclosure provides a display device comprising:
- a light-emitting panel comprising a plurality of pixels, wherein a given pixel comprises sub-pixels of at least two different colours that are arranged sequentially along a first direction;
- a lenticular array arranged on an optical path of the light-emitting panel, the lenticular array comprising a plurality of lenticular lenses, wherein a longitudinal axis of a given lenticular lens aligns with the first direction; and
- at least one processor configured to:
- generate drive signals for the plurality of pixels, based on a light field image to be displayed; and
- drive the plurality of pixels using the drive signals to display the light field image.

In a second aspect, the present disclosure provides a system comprising:
- a display device of any of the preceding claims;
- an optical combiner arranged on an optical path of the display device and on an optical path of a real-world light field of a real-world environment; and
- at least one processor configured to:
- generate or retrieve a light field image to be displayed via the display device; and
- send the light field image to the display device,
- wherein the display device is employed to display the light field image for producing a synthetic light field and wherein the optical combiner is employed to reflect the synthetic light field towards eyes of at least one user, whilst optically combining the real-world light field with the synthetic light field.

The present disclosure describes the display device that is implemented in head-up displays (HUDs), augmented reality (AR) systems or other display technologies requiring display of light field images. The system incorporates the display device with the optical combiner, enabling integration of synthetic and real-world light fields. The display device is implemented as an LCD device, in which a colour filter array (having colour filters) is arranged on the optical path of a backlight unit and an LC layer (having LC cells). Alternatively, the display device is implemented as an LED/micro-LED/mini-LED/OLED-based display, in which the light-emitting panel itself consists of self-emitting elements. The arrangement of sub-pixels (such as LEDs of different colours) in self-emitting displays is structured in a manner similar to the described display device. The term "light-emitting panel" as used throughout the present disclosure encompasses both types of implementations. Further, while conventional displays utilize red, green, and blue (RGB) sub-pixels, some implementations may use only two colours, such as red and green, particularly in military and aviation HUDs where simplified colour schemes are beneficial. The lenticular array positioned on the optical path of the light-emitting panel supports horizontal parallax viewing by directing light from different vertical stacks of sub-pixels towards specific viewing angles. The term "sub-pixel" as used throughout the present disclosure refers to a smaller or sub-structural element within each pixel that emits light of a specific colour. The term "pixel" as used throughout the present disclosure refers to an individual imaging unit of the light-emitting panel. The pixel is responsible for generating a distinct portion of each displayed image. Moreover, size, spacing and organization associated with each pixel influence overall display resolution, brightness and contrast levels of the light-emitting panel. The combination of multiple sub-pixels of different colours within a single pixel enables full-spectrum colour reproduction by the display device. The arrangement of the lenticular lenses along the first direction makes the display device highly effective for creating stereoscopic three-dimensional (3D) effects or supporting multi-view displays by allowing different perspectives of the light field image to reach different viewpoints. The term "first direction" as used throughout the present disclosure refers to a predefined spatial orientation along which the sub-pixels within a pixel are arranged sequentially. The first direction preferably refers to a vertical direction along which the sub-pixels are arranged in a stacked column-like formation of the sub-pixels. The display device uses the arrangement of the sub-pixels in the vertical direction instead of the conventional side-by-side arrangement of RGB (red, green and blue) sub-pixels in most LCD devices, minimizing colour errors and unwanted visual distortions. The term "light field image" as used throughout the present disclosure refers to a processed dataset containing multi-directional light ray information. The light field image allows accurate depth-aware image rendering for perspectives of different viewers. The processor converts the light field image into precise drive signals that control the pixels. Further, contrasting to 2D images, the light field image encodes the spatial variations in light intensity and direction to provide realistic 3D visualization along with the interactive depth adjustments. The sequential arrangement of sub-pixels of at least two different colours along the first direction, in combination with the lenticular array, significantly reduces chromatic aberration, thereby improving image clarity The display device comprises the light-emitting panel comprising the plurality of pixels. Further, a given pixel comprises sub-pixels of at least two different colours that are arranged sequentially along a first direction. The light-emitting panel is responsible for emitting light based on input signals. The emitted light forms the visual content presented by the display device. The sub-pixels emit light of different colours within the pixel. The first direction defines a spatial orientation along which the sub-pixels are positioned. Preferably, the first direction is a vertical direction along which the sub-pixels are arranged in a stacked configuration. The arrangement of the sub-pixels in the first direction controls how light is emitted by the light-emitting panel, enabling proper interaction of the emitted light with other components of the display device.

The sequential arrangement of the sub-pixels along the first direction enables each colour component to remain correctly positioned within the emitted light, significantly reducing chromatic aberration. The alignment of the sub-pixels prevents unintended colour dispersion by maintaining a structured emission pattern, enabling the displayed image to preserve clarity and colour accuracy across different viewing angles.

The display device further comprises the lenticular array arranged on the optical path of the light-emitting panel. The lenticular array is configured to modify the direction of light emitted by the light-emitting panel. The modification of the direction of light emitted by the light-emitting panel enables to control how different portions of the light field image are perceived from different viewpoints. The lenticular array comprises the plurality of lenticular lenses. Each lenticular lens is an elongated optical element that refracts and directs light in a controlled manner.

Moreover, the longitudinal axis of the given lenticular lens aligns with the first direction. The longitudinal axis of the given lenticular lens defines a primary lengthwise orientation along which the lenticular lens extends. Preferably, the longitudinal axis aligns with the first direction, enabling proper interaction between the lenticular array and the sub-pixel arrangement of the light-emitting panel. The alignment of the longitudinal axis of the lenticular lens with the first direction enables directing light from different vertical stacks of sub-pixels toward specific viewing angles. The directing of light from different vertical stacks of sub-pixels toward specific viewing angles therefore supports horizontal parallax viewing. The refraction of light by the lenticular lenses allows each viewpoint to receive a distinct portion of the light field image. The arrangement of the lenticular lenses along the first direction enables separation of different perspectives within the light field image, making the display device effective for creating stereoscopic 3D effects or supporting multi-view displays.

The display device also comprises at least one processor configured to generate drive signals for the plurality of pixels, based on the light field image to be displayed and drive the plurality of pixels using the drive signals to display the light field image. The at least one processor is configured to process image data and generate corresponding drive signals. The generation of the drive signals enables modulation of the light emitted by each pixel, facilitating each pixel to emit light at the required intensity and colour to form the light field image. The generation of the drive signals based on the light field image enables precise control over how light is emitted by the light-emitting panel. The at least one processor drives the plurality of pixels using the drive signals. The driving of the plurality of pixels using the drive signals enables the emitted light to correspond accurately to the intended visual content.

The generation of the drive signals based on the light field image enables control over the light emitted from different vertical stacks of sub-pixels, allowing each viewpoint to receive a distinct portion of the light field image, supporting horizontal parallax viewing. The driving of the plurality of pixels using the drive signals facilitates the emitted light to be directed toward specific viewing angles, making the display device effective for creating stereoscopic 3D effects or supporting multi-view displays.

The system comprises the optical combiner arranged on the optical path of the display device and on the optical path of the real-world light field of the real-world environment. The optical combiner is configured to partially transmit and partially reflect incoming light, such as, the light emitted by the light-emitting panel of the display device and ambient light from the real-world environment. The arrangement of the optical combiner on the optical path of the display device enables to direct the synthetic light field produced by the display device toward an intended viewing position. The arrangement of the optical combiner on the optical path of the real-world light field enables transmission of real-world visual information to the viewer.

The arrangement of the optical combiner on the optical path of the display device and the real-world light field enables merging of the synthetic light field with the real-world light field. The merging of the synthetic light field with the real-world light field allows the augmented content to appear naturally integrated within the real-world environment. The optical combiner directs different portions of the synthetic light field toward different viewpoints while allowing transmission of the real-world light field, supporting horizontal parallax viewing. The structured combination of the synthetic light field with the real-world light field allows different perspectives of the augmented content to be presented at appropriate viewing angles, making the system effective for creating stereoscopic 3D effects or supporting multi-view displays.

The system further comprises at least one processor configured to generate or retrieve the light field image to be displayed via the display device and send the light field image to the display device. The at least one processor processes image data and determines the appropriate light field image to be displayed. The generation or retrieval of the light field image by the at least one processor enables accurate representation of virtual content by the system. The sending of the light field image to the display device enables the display device to receive the required image data for producing the synthetic light field.

The display device is employed to display the light field image for producing the synthetic light field. The display of the light field image by the display device allows the synthetic light field to be generated with the correct spatial and depth characteristics. The optical combiner is employed to reflect the synthetic light field towards the eyes of at least one user, whilst optically combining the real-world light field with the synthetic light field. The reflection of the synthetic light field by the optical combiner facilitates the virtual content to be directed toward the correct viewing position of the at least one user. The optical combination of the real-world light field with the synthetic light field allows the augmented content to appear naturally integrated within the real-world environment.

The sending of the light field image to the display device enables generation of the synthetic light field with spatially varying light emissions. The generation of the synthetic light field allows the optical combiner to reflect different portions of the synthetic light field toward different viewpoints. The reflecting of different portions of the synthetic light field toward different viewpoints supports horizontal parallax viewing. The structured emission of light by the display device based on the light field image enables directing of different perspectives of the augmented content toward specific viewing angles. The optical combination of the synthetic light field with the real-world light field enables accurate depth perception, making the system effective for creating stereoscopic 3D effects or supporting multi-view displays.

Optionally, a length of a given sub-pixel in a second direction is larger than a breadth of the given sub-pixel in the first direction, the second direction being perpendicular to the first direction. The term "second direction" as used throughout the present disclosure refers to an axis that is perpendicular to the first direction, defining an orthogonal orientation along which pixel structures and optical elements may be arranged. It will be appreciated that when the first direction refers to the vertical direction along which the sub-pixels are arranged, the second direction refers to a horizontal direction. The second direction is critical for determining sub-pixel dimensions, optimizing pixel layout and aligning with lenticular lenses to allow correct light distribution and minimal distortion in 3D image rendering.

The increase in the sub-pixel length compared to the breadth thereof in the first direction enables the display device to minimize light dispersion, resulting in sharper images and mitigate colour aberrations caused by misalignment of conventional RGB sub-pixels, preventing colour distortions when viewed at any angle, thereby improving 3D depth perception. The structure also enables that each sub-pixel is properly aligned with the viewing angle. The alignment of each sub-pixel with the viewing angle is beneficial for lenticular displays. Thus, the dimensions of the sub-pixels are selected to optimize light emission and enable high-quality image reproduction.

Followingly, the breadth of the given sub-pixel in the first direction is smaller than the length of the given sub-pixel in the second direction, the arrangement of the sub-pixels allows controlled combining of colours, when viewed via the lenticular array. The sub-pixels enable efficient alignment with the lenticular lenses, therefore amplified brightness distribution and the smooth colour transitions across varying viewing angles. The arrangement of the sub-pixels with a greater length in the second direction provides enhanced colour uniformity and reduces variations in brightness when observed from multiple viewpoints. The structured alignment of the sub-pixels and lenticular lenses facilitates precise image rendering by optimizing light distribution, making the display device suitable for applications requiring accurate depth perception and consistent visual representation across different angles.

The increased length of sub-pixel as compared to the breadth enables alignment of the sub-pixels with lenticular lenses. The alignment manages light distribution toward varying viewing angles, and also provides enhanced depth perception in the displayed light field image. The structured placement of the sub-pixels reduces dark spaces between the sub-pixels, increasing an effective area of the arrangement of the sub-pixels that contributes to image formation. The alignment of the sub-pixels with the lenticular lenses allows minimization of moiré effects by optimizing a manner in which light is refracted through the lenticular array, providing smoother transitions between different depth levels in the displayed content. The term "moiré effects" as used throughout the present disclosure refers to unwanted visual patterns that appear when two or more repetitive structures, such as pixel grids and lenticular lenses, interfere with each other.

The term "moiré effects" as used throughout the present disclosure refers to unwanted visual patterns that appear when two or more repetitive structures, such as pixel grids and lenticular lenses, interfere with each other. The occurrence of moiré effects are associated with presence of wavy lines, rippling distortions or similar artefacts. The moiré effects degrade the clarity of the visual content presented on the display device. The occurrence of moiré effects is noticed in high-resolution displays that employ structured optical elements, such as in lenticular-based 3D displays and AR systems. In such displays, precise alignment between sub-pixels and optical layers is required for optimal image quality. The arrangement of the sub-pixels in the first direction relative to the lenticular lenses facilitates controlled alignment, allowing reduction of crosstalk between different viewing zones. The structured placement of the sub-pixels and the alignment with the lenticular array provide improved depth perception and clarity in the displayed light field image, enhancing the quality of the 3D visual content.

Optionally, the at least two different colours include a red colour, a green colour and a white colour and optionally, a blue colour. The selection of red, green, white and optionally blue sub-pixels enables high brightness and better contrast while maintaining accurate colour reproduction. Moreover, an inclusion of the white sub-pixels significantly increases perceived brightness. Consequently, the display device is employed in outdoor and high-contrast applications. The white sub-pixels allow improved light transmission. The increased light transmission provided by the white sub-pixels allows more light to reach the viewer without being absorbed or diffused, unlike in conventional RGB displays where brightness is limited by colour filtering. Further, the white sub-pixels enable the display device to achieve a higher luminance output while maintaining energy efficiency, reducing a need for high intensity backlighting and improving both power efficiency and display longevity.

The positioning of red, green, white and optionally blue colour sub-pixels provides advantages for HUDs and AR systems as external lighting conditions alter. White sub-pixels provide enhanced brightness without high dependence on high-intensity backlighting, enabling improved visibility in the outdoor environments. The optional use of blue sub-pixels enables a wide range of colour representation and amplifies colour accuracy, therefore the display device is highly suitable, where accurate colour reproduction is prioritized over highest brightness.

In yet another embodiment, in the given pixel, individual ones of sub-pixels of the white colour are interspersed among sub-pixels of remaining colours, such that each sub-pixel of the white colour is positioned adjacent to at least one sub-pixel of a different colour. The arrangement of white sub-pixels interspersed among the remaining coloured sub-pixels allows increased brightness and facilitates improved colour accuracy by distributing light more evenly across the pixel. The white sub-pixels are interspersed among the sub-pixels of remaining colours, thereby enabling that every white sub-pixel is placed next to at least one coloured sub-pixel, preventing excessive colour saturation and allowing brightness levels to look natural. By positioning white sub-pixels adjacent to coloured sub-pixels, the display device averts colours from appearing pale and improves colours visibility. Shining white light generated by the white sub-pixels around the coloured sub-pixels can improve visibility and reduce the appearance of pale or washed-out colours caused by excessive brightness. Further, the white sub-pixels interspersed among the remaining coloured sub-pixels enables consistent distribution of luminance across the display device. The sub-pixels provide consistent brightness across varying viewing angles, enabling 3D images to manage clarity at different depths. The well managed dispersal of luminance in relation to the sub-pixel arrangement makes the display device efficient for HUD applications and lenticular-based 3D displays, where stable brightness is required for accurate depth perception. Additionally, the arrangement of the white sub-pixels next to coloured sub-pixels minimizes colour distortions, which is a problem in display devices where brightness-enhancing sub-pixels are clustered together. Further, since the layout with the interspersed white sub-pixels helps light to spread more evenly, the display device can maintain high brightness without needing to increase backlight intensity, improving both energy efficiency and long-term performance.

In an example, the white sub-pixels (W) are interspersed with red sub-pixels (R), green sub-pixels (G) and blue sub-pixels (B) in a WRWGWB sub-pixel arrangement for each pixel. The WRWGWB sub-pixel arrangement is associated with a strategic positioning of the white, red, green and blue sub-pixels to balance brightness and colour accuracy, thereby significantly enhancing visibility in bright environments. The increased visibility in bright environments makes the display device suitable for outdoor applications and high-contrast display requirements. The WRWGWB pixel structure enables chromatic balance to be maintained while reducing colour crosstalk, which is essential for rendering fine details in high-resolution 3D applications. For example, the white sub-pixels are arranged in every alternate row of a column of sub-pixels comprising red, green and blue pixels. The placement of white sub-pixels among the red, green and blue sub-pixels increases the brightness associated with the presentation of visual content without compromising image quality. The placement of the white sub-pixels in alternate rows among the red, green and blue sub-pixels increases the brightness of the display device by a magnitude of three to five times in half of a per-pixel area. Thus, the images displayed on the display device are clearer and more visible in different lighting conditions. The arrangement of the white sub-pixels in relation to the red, green and blue sub-pixels provides improved colour accuracy when viewed from different angles, making the display device particularly suitable for automotive HUDs and other applications requiring precise colour representation.

Optionally, in the given pixel, a number of the sub-pixels of the white colour is same as a number of the sub-pixels of the remaining colours. The maintaining of an equal number of white sub-pixels and coloured sub-pixels within each pixel allows the display device to achieve a stable balance between brightness and colour fidelity. The balanced sub-pixel distribution prevents white sub-pixels from overwhelming a colour accuracy associated with the display device, thereby preserving vibrant colours while benefiting from enhanced brightness. The display device overcomes issues associated with certain areas thereof appearing unnaturally bright or dim. Thus, the display device facilitates a consistent viewing experience for the viewer. Further, an even distribution of the white sub-pixels and the coloured sub-pixels provides high dynamic contrast, thereby enabling black levels to remain deep and colours displayed on the display device to remain vivid in high-contrast images. For each pixel, equal number of white sub-pixels and coloured sub-pixels is significant for 3D displays and AR systems, where the perception of depth is required, while maintaining distinct visual information across different viewpoints.

Further, positioning the white sub-pixels in a defined ratio with the red, green and blue sub-pixels allows predictable manufacturing and calibration, reducing variations between different light-emitting panels. The consistent placement of sub-pixels facilitates uniform brightness and colour reproduction across the display device, preventing sudden changes that could otherwise lead to unnatural glowing or dim patches. The predictable organization of sub-pixels supports applications that require stable lighting conditions, including professional visualization, medical imaging and high-end consumer electronics.

Optionally, for a given lenticular lens, sub-pixels that are arranged on a same scanline perpendicular to the first direction and belong to pixels on whose optical path the given lenticular lens lies, have a same colour. The term "scanline" as used throughout the present disclosure refers to a horizontally aligned row of sub-pixels that extends perpendicular to the first direction. The scanline represents a fundamental unit of image rendering and determines how data corresponding to the visual content is processed, aligned and displayed across the screen. Further, proper alignment of the scanline enables uniform colour distribution and minimizes image distortions in lenticular-based 3D displays. Further, the term "optical path" as used throughout the present disclosure in reference to a lenticular lens, relates to a specific region of the display panel where the lenticular lens directs and refracts emitted light. The region of the display panel where the lenticular lens directs and refracts emitted light determines which pixels contribute to the perceived image for each viewpoint.

The arranging of the sub-pixels of the same colour along the scanline perpendicular to the first direction allows reduction of unwanted colour blending and distortion, enabling each pixel to emit well-separated light. It will be appreciated that a common issue in traditional lenticular displays is colour bleeding, where adjacent colours mix and create blurred images. The display device prevents colour bleeding by keeping all the sub-pixels within a scanline of the same colour. Moreover, the sub-pixels along the scanline sharing the same colour within the optical path enhances colour separation, improves depth accuracy and maintains image clarity in stereoscopic displays.

The aforesaid alignment of the sub-pixels having the same colour also plays a key role in multi-view 3D consistency because viewers may look at the display from different angles. Consequently, arranging the sub-pixels of the same colour along the scanline perpendicular to the first direction allows each viewer to perceive the intended colours without distortion or shifting. The positioning of the sub-pixels of the same colour along the scanline perpendicular to the first direction is particularly important for AR displays and HUDs, where multiple viewers may observe the display device from different positions. Additionally, aligning colours within the scanline enhances brightness and energy efficiency, since more light is directed correctly without unnecessary dispersion. Thus, arranging the sub-pixels of the same colour along the scanline perpendicular to the first direction allows the display device to maintain high visibility in outdoor environments and provides improved performance for AR applications.

Optionally, for a given lenticular lens, sub-pixels belonging to pixels on whose optical path a first half of the given lenticular lens lies and sub-pixels belonging to pixels on whose optical path a second half of the given lenticular lens lies, arranged on a same scanline perpendicular to the first direction, have different colours. The term "first half" as used throughout the present disclosure in reference to the lenticular lens, relates to a section of a given lenticular lens that covers the optical path of a first set of pixels. The first half of the lenticular lens directs light from specific sub-pixels toward an intended viewing angle, influencing depth perception and image separation in a multi-view 3D display system. Further, the term "second half" as used throughout the present disclosure in relation to a lenticular lens, refers to a section of a given lenticular lens that covers the optical path of a second set of pixels, complementing the first half. The second half directs light from a different subset of sub-pixels, facilitating each eye or viewpoint of the viewer to receive a distinct colour channel, which enhances stereoscopic accuracy and reduces ghosting in 3D images.

The sub-pixels in the first half of the optical path of the lenticular lens emit a different colour than those in the second half, while still being arranged on the same scanline perpendicular to the first direction. The division of the colour projection between the first and second halves of the lenticular lens enhances depth perception and stereoscopic imaging, making 3D visuals sharper and more immersive. The display device enables images perceived by the left-eye and right-eye of the viewer remain to distinct by carefully dividing the colour projection between the first and second halves of the lenticular lens, reducing crosstalk and ghosting artifacts that can blur stereoscopic content.

The dividing of the colour projection between the first and second halves of the lenticular lens allows the display device to support multi-user perspectives. Consequently, different viewers positioned at different angles will still see a properly separated 3D image without distortion. The division of colour projection between the first and second halves of the lenticular lens is particularly useful in AR/VR systems and multi-user displays, where accurate colour separation is necessary for a seamless experience. The separating of the colour projection across the first and second halves of the lenticular lens improves contrast and depth perception, enhancing the appearance of 3D objects. For example, the 3D objects appear clearer and more defined in multi-layered content.

The optimization of alignment of the sub-pixels within the scanlines and the projection of colours within the lenticular lens allows the display device to have better resolution, stronger depth fidelity and reduced visual artifacts compared to conventional displays. The alignment of the sub-pixels within the scanlines and the projection of colours within the lenticular lens provides a more realistic and immersive 3D experience. The display device is suitable for next-generation AR, multi-user displays and high-performance HUDs.

Optionally, a first half of a given lenticular lens lies on an optical path of a first set of pixels, while a second half of the given lenticular lens lies on an optical path of a second set of pixels, wherein a sub-pixel belonging to a given pixel of the first set and a sub-pixel belonging to a corresponding pixel of the second set, arranged on a same scanline perpendicular to the first direction, have different colours. Further, each lenticular lens is divided into a first half and a second half. The first half of the lenticular lens is aligned with the first set of pixels and the second half is aligned with the second set of pixels. The first half and the second half of the lenticular lens enhance depth perception and stereoscopic effects associated with 3D images. Moreover, a sub-pixel from the first set emits a different colour than a corresponding sub-pixel from the second set within a scanline arranged perpendicular to the first direction. The dividing of the optical path of the lenticular lens into the first half and the second half enables each eye of the viewer to receive distinct colour channels. Further, aligning the first half with the first set of pixels and the second half with the second set of pixels provides a sharper and more immersive 3D effect while reducing ghosting and unwanted image blending. The aforesaid arrangement of the first half and the second half also improves multi-view adaptability. Thus, viewers at different viewing angles still perceive accurate depth without distortions. The positioning of different colours in the first half and the second half of the lenticular lens allows the display device to eliminate overlapping colour zones, preventing degradation of depth clarity. Thus, each of the first half and the second half of the lenticular lens evenly distributes light and prevents dim or overly bright areas that affect realism associated with the 3D images. Additionally, controlling of display of the depth information enables the display device to provide smooth motion transitions and allow the 3D images to remain stable when the viewers shift positions.

Each of the first half and the second half of the lenticular lens distributes light evenly, preventing dim or overly bright areas that affect realism in the 3D images. The division of the optical path of the lenticular lens into two halves reduces crosstalk significantly between the left and right views by limiting unintended overlap of colour channels. The division of the optical path of the lenticular lens allows uniform blending of colours, avoiding colour banding and improving overall image smoothness. The alignment of the sub-pixels with the divided optical path facilitates a higher luminance resolution, enabling a denser distribution of brightness levels across the display device. The control of depth information presentation provides smooth motion transitions, allowing 3D images to remain stable when viewers shift positions.

Optionally, at least 50 percent of the sub-pixels in the given pixel have a parallelogram-like shape. The term "parallelogram-like shape" as used throughout the present disclosure in reference to a shape of the sub-pixel, relates to a sub-pixel with slanted edges that form a parallelogram shape rather than a conventional rectangular shape. The parallelogram-like shape of the sub-pixel improves pixel packing efficiency, optical alignment and colour uniformity, reducing moiré effects and colour fringing in lenticular 3D displays. Further, at least 50% of a total number of the sub-pixels in each pixel have the parallelogram-like shape, allowing better alignment with the lenticular lenses and more efficient use of space. Moreover, unlike traditional rectangular sub-pixels that comprise small gaps therebetween that reduce display sharpness, the parallelogram-like shape of the sub-pixels enables a tighter pixel arrangement. The arrangement of sub-pixels with a parallelogram-like shape minimizes dark spaces and increases the effective resolution of the display device. Consequently, the visual content presented on the display device is associated with improved visual quality, enabling use of the display device in high-precision AR and 3D applications.

Further, the parallelogram-like shape of the sub-pixels also enables to reduce optical distortions, such as moiré effect and colour fringing. It will be appreciated that moiré effects and colour fringing often occur in lenticular-based 3D displays when the sub-pixels do not align properly with the lenticular lens. The parallelogram-like shape of at least 50% of the sub-pixels enables colours to remain stable and consistent across different viewing angles, eliminating unwanted shifts in colour perception. Additionally, an optimized sub-pixel layout achieved by the shape of the sub-pixels enhances brightness and energy efficiency, making the display device more suitable for AR, VR and HUD systems that require high visibility in different lighting conditions.

Optionally, in the given pixel, an orientation of a parallelogram-like shape of a given sub-pixel is opposite to an orientation of a parallelogram-like shape of another sub-pixel adjacent to the given sub-pixel. The arrangement of sub-pixels with opposite orientations in adjacent positions helps to distribute light more evenly across the display device. The even light distribution reduces moiré effects and facilitates smooth colour transitions. The positioning of the sub-pixels with opposite orientations in adjacent positions allows better alignment of the pixels with the lenticular lenses. The aligning of the pixels more effectively with the lenticular lenses prevents uneven brightness and colour shifting, which are common in traditional displays with conventional sub-pixel layouts. The placement of the sub-pixels with opposite orientations in adjacent positions minimizes gaps between sub-pixels, allows tighter pixel packing and provides higher effective resolution without increasing the size of the display device. Consequently, the display device produces sharper images while maintains consistent 3D depth perception from different viewing angles.

Optionally, the given lenticular lens lies on an optical path of N pixels, wherein N lies in a range of 5 to 18. The N-pixel range allows the display device to be customized based on size, viewing distance and required depth fidelity. The value of N is chosen from 5, 7, 9, 11, 13, 15 and 17 to 6, 8, 10, 12, 14, 16 and 18. Further, a lower N-value, such as 5, 6, 7, 8 or 9, results in each lenticular lens covering fewer pixels. Moreover, with fewer pixels under each lenticular lens, the display device provides higher image sharpness because the resolution per viewing zone remains high. For high-precision applications, such as AR headsets and medical imaging, lower N-value is preferred. The minimum number of pixels per lenticular lens amplifies the separation between varying depth levels, thereby depth perception accuracy is enhanced which is more appropriate for the applications that require accurate spatial visualization. Moreover, higher N-value, such as 14, 15, 16, 17 or 18, results in each lenticular lens covering more pixels. Further, with more pixels contributing to each lenticular projection, the display device provides a wider field of view and smoother depth transitions because more intermediate viewpoints are available between different depth levels. Thus, applications such as multi-user environments, automotive HUDs, and large-scale 3D display devices are benefited by the higher N-value, where seamless depth blending and broader viewing coverage are prioritized over extreme sharpness in individual viewpoints. Smoother transitions between different viewing angles are also allowed by the higher N-value. The abrupt changes in perspective being reduced as the display device is moved relative to by a viewer. Multiscopic applications are enhanced by accommodating multiple distinct viewpoints, where a gradual and natural transition between different perspectives is required by seamless 3D visualization. The display device enables the depth perception to remain stable across different viewing angles by fine-tuning the number of pixels covered by each lenticular lens. The ability to maintain stable depth perception across different viewing angles reduces visual distortions and flickering effects. Consequently, the ability to maintain stable depth perception across different viewing angles is useful in automotive displays, AR systems and immersive 3D environments where multiple viewers observe the display device from different positions and perspectives. Further, an ability to adjust the number of pixels covered by each lenticular lens allows manufacturers to optimize the display device for specific use cases. The adjustment of the number of pixels covered by each lenticular lens provides maximum adaptability of the display device for a wide range of applications.

The present disclosure also relates to the system as described above. Various embodiments and variants disclosed above, with respect to the aforementioned first aspect (namely, the display device), apply mutatis mutandis to the system.

Optionally, the system further comprises a tracker. The at least one processor is configured to determine a relative location of a first eye and of a second eye of the at least one user with respect to the optical combiner, by utilising the tracker. The term "tracker" as used throughout the present disclosure refers to a sensor-based system configured to detect, monitor and analyse a position of the eyes of the user in real time. The tracker allows the processor to dynamically adjust the synthetic light field alignment based on head and eye movements of the user. The real-time modifications to the synthetic light field alignment enable accurate positioning of virtual content within the real-world environment. Further, infrared sensors, stereo cameras, structured light or time-of-flight depth mapping techniques comprise the tracker to deliver high-accuracy gaze and head-tracking data with minimal latency. The light field image is generated or retrieved based on the relative location of the first eye and of the second eye of the at least one user with respect to the optical combiner. The at least one processor utilizes data from the tracker to determine the real-time spatial relationship between the eyes of the user and the optical combiner. The processor enables the displayed light field image to be dynamically adapted to match a perspective of the user by precisely identifying a location of the first and second eyes (such as, right and left eyes) of the user. The real-time adaptation of the displayed light field image prevents misalignment artefacts, visual distortions and incorrect depth perception, which can otherwise occur if the virtual imagery does not properly correspond to a real-world viewpoint of the user. The light field image is generated or retrieved based on the relative location of the first eye and the second eye of the user with respect to the optical combiner. The real-time adjustment of the displayed light field image enables the synthetic light field to maintain correct parallax effects, allowing each eye of the user to perceive virtual content with accurate depth and spatial positioning. The system enhances stereoscopic effect for the user by dynamically adjusting the displayed imagery in response to real-time tracking data, thereby preventing ghosting and providing a more immersive augmented reality experience.

Also, an integration of real-time eye tracking and adaptive light field rendering, enables the system to allow digital overlays to remain correctly aligned with a field of vision of the user, enabling high-precision application of the system in AR, HUDs and interactive visualization systems. The combination of real-time eye tracking and adaptive light field rendering is particularly beneficial for aviation displays, automotive HUDs, medical visualization and training simulations, where precise spatial alignment of virtual and real-world content is essential.

Optionally, the plurality of lenticular lenses are individually controllable. The at least one processor is configured to control a shape of a given lenticular lens of the lenticular array, based on the relative location of the first eye and of the second eye of the at least one user with respect to the optical combiner, to direct light rays corresponding to a first set of pixels of the light field image and light rays corresponding to a second set of pixels of the light field image to produce a first part and a second part of the synthetic light field, respectively, for the first eye and the second eye of the at least one user. The term "individually controllable" as used throughout the present disclosure in relation to the lenticular lens, refers to a lenticular lens whose optical properties, such as curvature, focal length or refractive index, is adjusted in real time. The ability to adjust the optical properties of each lenticular lens enables the system to modify light direction, improve depth accuracy and enhance 3D visualization based on the head and eye movements of the user. The system enables light rays to be precisely guided to a correct viewing position of the user by allowing each lenticular lens to be controlled independently, thus minimizing optical distortions and maximizing image clarity.

The at least one processor is configured to control the shape of the given lenticular lens of the lenticular array, based on the relative location of the first eye and the second eye of at least one user with respect to the optical combiner. The real-time adjustment of the lenticular lens enables the processor to modify its curvature or orientation, allowing emitted light to be accurately directed toward the eyes of the user. The capability to control the shape of each lenticular lens prevents misalignment issues, ghosting artefacts and unintended crosstalk between left-eye and right-eye images, maintaining a sharp and immersive 3D effect.

The lenticular lenses direct light rays corresponding to a first set of pixels of the light field image and light rays corresponding to a second set of pixels of the light field image, thereby producing a first part and a second part of the synthetic light field, respectively, for the first eye and the second eye of at least one user. The independent control of the lenticular lenses enables each eye to receive a distinct stereoscopic image, maintaining proper depth perception and realistic parallax effects. The dynamic adjustment of properties of the lenticular lens enables the system to allow virtual content to remain correctly positioned and visually consistent, even as the user moves.

The system enables precise alignment of synthetic and real-world visual elements by incorporating real-time adaptive lens control, making it particularly beneficial for AR applications, HUDs and immersive training simulations. The ability to adjust individual lenticular lenses enables virtual imagery to appear anchored within the natural environment of the user, enhancing spatial awareness, depth precision and overall AR realism.

DETAILED DESCRIPTION OF THE DRAWINGS

FIG. 1 is a simplified top view of a display device 100, in accordance with an embodiment of the present disclosure. The display device 100 comprises a light-emitting panel 102 comprising a plurality of pixels 104. Further, a given pixel 104 comprises sub-pixels 106, 108 of at least two different colours that are arranged sequentially along a first direction A to B. The sub-pixels 106 having a first colour of the two different colours is represented using a pixel with the letter 'W', indicating a white sub-pixel whereas sub-pixels 108 having a second colour of the two different colours is represented using a pixel with the letter 'R', indicating a red sub-pixel. It will be appreciated that the colours white and red are selected for illustrative purposes only. The colours are chosen from a group comprising red, green, blue and white, without departing from a scope of the present disclosure. For illustrative purposes, the pixel 104 has been shown as a separate entity i.e., a rectangle enclosing the sub-pixels 106 and 108. In practice, the pixel 104 may only be formed by the combination of the sub-pixels 106 and 108 and therefore, may not be a separate entity. The first direction A-B has been indicated using a dashed arrow passing from a bottom of the given pixel 104 to a top of the given pixel 104. Alternatively, the first direction A-B is considered as a direction from the sub-pixel 108 towards the sub-pixel 106. The display device 100 further comprises a lenticular array 110 arranged on an optical path of the light-emitting panel 102. The lenticular array 110 comprises a plurality of lenticular lenses 112. Moreover, a longitudinal axis X-Y of a given lenticular lens 114 aligns with the first direction A to B. The display device 100 also comprises at least one processor 116 configured to:

generate drive signals for the plurality of pixels 104, based on a light field image to be displayed; and drive the plurality of pixels 104 using the drive signals to display the light field image.

Figure 2:
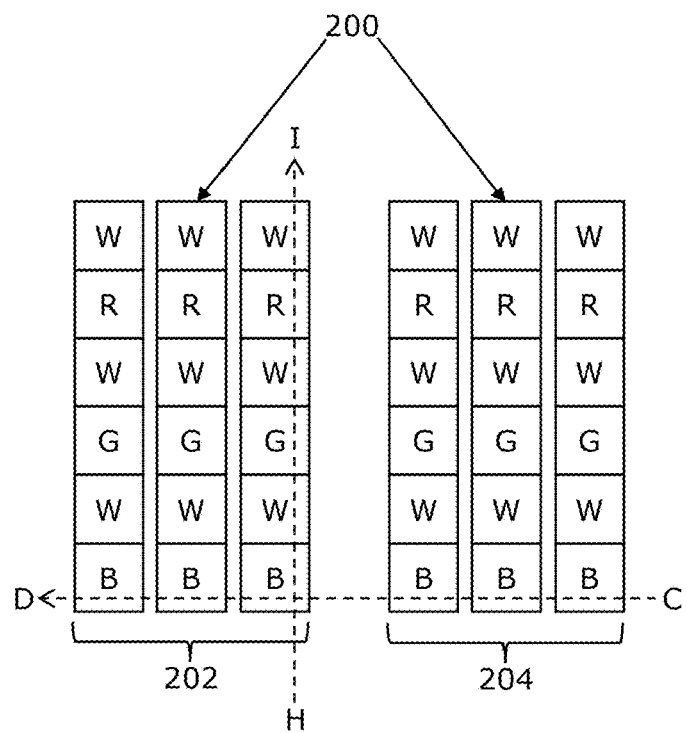
FIG. 2 shows given pixels for each of a left eye and right eye of a viewer, in accordance with an embodiment of the present disclosure.

FIG. 2 shows given pixels 200 for each of a left eye and right eye of a viewer, in accordance with an embodiment of the present disclosure. The given pixels 200 comprise pixels 202 for the left eye of the viewer and pixels 204 for the right eye of the viewer. Further, each pixel from the pixels 202 for the left eye and the pixels 204 for the right eye comprises sub-pixels associated with at least two different colours, such that the at least two different colours include a red colour (represented by sub-pixels filled with the letter 'R'), a green colour (represented by sub-pixels filled with the letter 'G') and a white colour (represented by sub-pixels filled with the letter 'W') and optionally, a blue colour (represented by sub-pixels filled with the letter 'B'). As shown, in the given pixel of each pixel from the pixels 202 for the left eye and the pixels 204 for the right eye of the viewer, individual ones of sub-pixels of the white colour are interspersed among sub-pixels of remaining colours, such that each sub-pixel of the white colour is positioned adjacent to at least one sub-pixel of a different colour. Moreover, in the given pixel from the pixels 202 and the pixels 204, a number of the sub-pixels of the white colour is same as a number of the sub-pixels of the remaining colours. Moreover, sub-pixels that are arranged on a same scanline C-D perpendicular to the first direction H-I and belong to pixels on whose optical path a given lenticular lens lies, have a same colour. It will also be appreciated that an example arrangement of the sub-pixels of the primary colours R, G and B and the colour W has been shown for illustration purposes only; there is other alternative arrangements of the sub-pixels.

It may be understood by a person skilled in the art that FIG. 2 merely depicts an example implementation of the given pixels 200, for sake of clarity, which should not unduly limit the scope of the claims herein. It is to be understood that the specific implementation of the given pixels 200 is not to be construed as limiting it to specific numbers or colours of sub-pixels. The person skilled in the art will recognize many variations, alternatives and modifications of embodiments of the present disclosure.

Figure 3A:
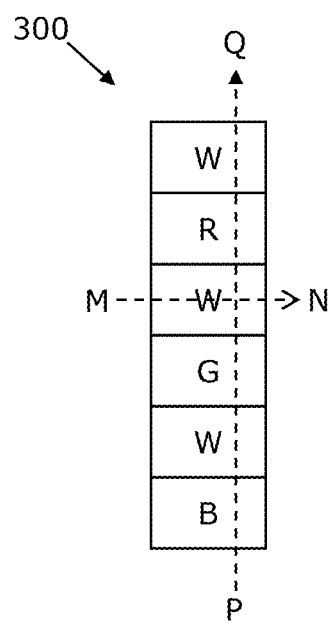
FIGS. 3A and 3B show given pixels, in accordance with various embodiments of the present disclosure.

FIG. 3A shows a given pixel 300, in accordance with an embodiment of the present disclosure. As shown, a length D1 of a given sub-pixel in a second direction P-Q is larger than a breadth D2 of the given sub-pixel in the first direction M-N, the second direction P-Q being perpendicular to the first direction M-N.

Figure 3B:
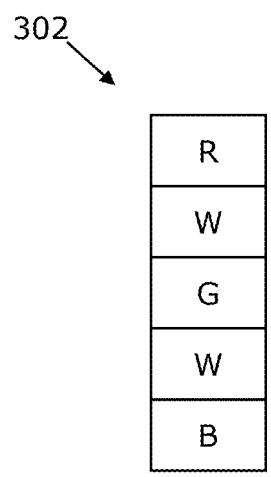

FIG. 3B shows a given pixel 302, in accordance with an embodiment of the present disclosure. The given pixel 302 comprises an odd number of sub-pixels, such that a white sub-pixel is not arranged adjacent to every of every other coloured (red, green and blue) sub-pixel.

Figure 4:
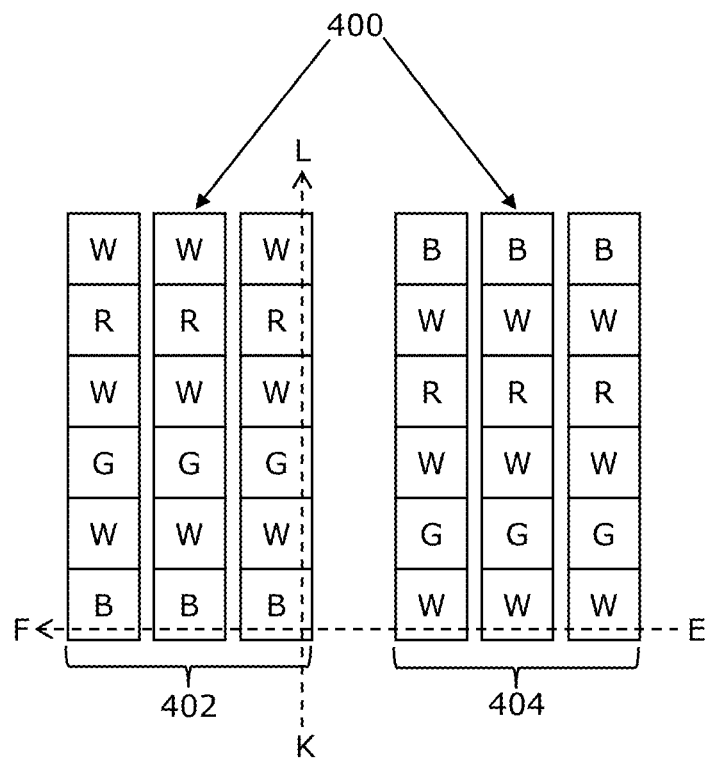
FIGS. 4, 5, 6 and 7 show given pixels for each of a left eye and right eye of a viewer, in accordance with various embodiments of the present disclosure.

FIG. 4 shows given pixels 400 for each of a left eye and right eye of a viewer, in accordance with an embodiment of the present disclosure. The given pixels 400 comprise pixels 402 for the left eye of the viewer and pixels 404 for the right eye of the viewer. Moreover, each pixel of from the pixels 402 for the left eye, and the pixels 404 for the right eye comprises sub-pixels associated with at least two different colours, W, R, G and B. As shown, a coloured sub-pixel R, G or B is arranged for the right eye of the viewer in the pixel 404 corresponding to every white sub-pixel W for the left eye of the viewer in the pixel 402 and vice versa. Thus, for a given lenticular lens, sub-pixels belonging to pixels 402 on whose optical path a first half of the given lenticular lens lies and sub-pixels belonging to pixels 404 on whose optical path a second half of the given lenticular lens lies, arranged on a same scanline E-F perpendicular to the first direction K-L, have different colours. It will also be appreciated that an example arrangement of the sub-pixels of the primary colours R, G and B and the colour W has been shown for illustration purposes only; there is other alternative arrangements of the sub-pixels.

It may be understood by a person skilled in the art that FIG. 4 merely depicts an example implementation of the given pixels 400, for sake of clarity, which should not unduly limit the scope of the claims herein. It is to be understood that the specific implementation of the given pixels 400 is not to be construed as limiting it to specific numbers or colours of sub-pixels. The person skilled in the art will recognize many variations, alternatives and modifications of embodiments of the present disclosure.

Figure 5:
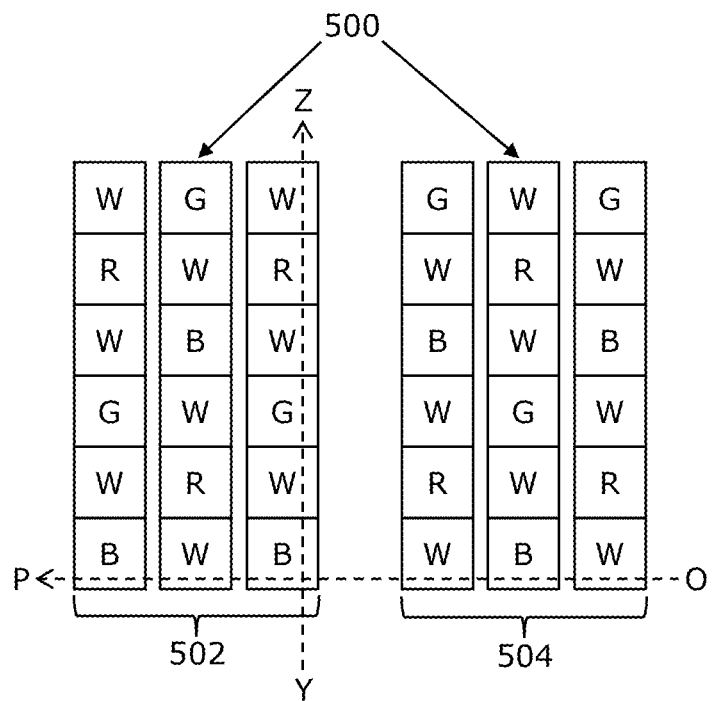

FIG. 5 shows given pixels 500 for each of a left eye and right eye of a viewer, in accordance with an embodiment of the present disclosure. The given pixels 500 comprise pixels 502 for the left eye of the viewer and pixels 504 for the to the right eye of the viewer. Moreover, each pixel from among the pixels 502 for the left eye of the viewer and from among the pixels 504 for the right eye of the viewer comprises sub-pixels associated with at least two different colours, W, R, G and B. As shown, a coloured sub-pixel R, G or B has been arranged in the pixels 504 for each white sub-pixel W in the pixels 502 and vice versa. Thus, a first half of a given lenticular lens lies on an optical path of a first set of pixels (such as the pixels 502 for the left eye of the viewer), while a second half of the given lenticular lens lies on an optical path of a second set of pixels (such as the pixels 504 for the right eye of the viewer), wherein a sub-pixel belonging to a given pixel of the first set 502 and a sub-pixel belonging to a corresponding pixel of the second set 504, arranged on a same scanline O-P perpendicular to the first direction Y-Z, have different colours. It will also be appreciated that an example arrangement of the sub-pixels of the primary colours R, G and B and the colour W has been shown for illustration purposes only; there is other alternative arrangements of the sub-pixels.

It may be understood by a person skilled in the art that FIG. 5 merely depicts an example implementation of the given pixels 500, for sake of clarity, which should not unduly limit the scope of the claims herein. It is to be understood that the specific implementation of the given pixels 500 is not to be construed as limiting it to specific numbers or colours of sub-pixels. The person skilled in the art will recognize many variations, alternatives and modifications of embodiments of the present disclosure.

Figure 6:
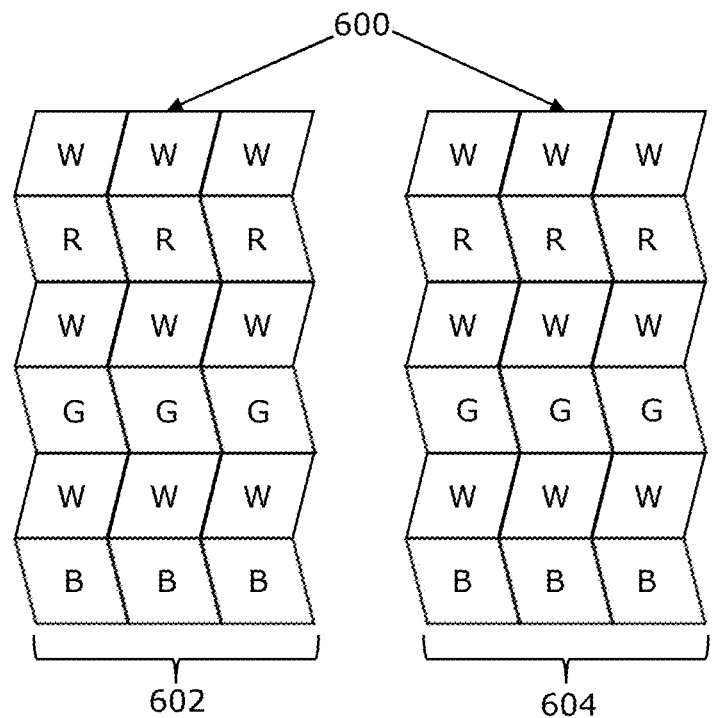

FIG. 6 shows given pixels 600 for each of a left eye and right eye of a viewer, in accordance with an embodiment of the present disclosure. The given pixels 600 comprise pixels 602 for the left eye of the viewer and pixels 604 for the right eye. Further, each pixel from among the pixels 602 for the left eye of the viewer and from among the pixels 604 for the right eye of the viewer comprises sub-pixels associated with at least two different colours, such that the at least two different colours include a red colour (represented by sub-pixels filled with the letter 'R'), a green colour (represented by sub-pixels filled with the letter 'G') and a white colour (represented by sub-pixels filled with the letter 'W') and optionally, a blue colour (represented by sub-pixels filled with the letter 'B'). As shown, in the given pixel of each pixel from among the pixels 602 for the left eye of the viewer and from among the pixels 604 for the right eye of the viewer, individual ones of sub-pixels of the white colour are interspersed among sub-pixels of remaining colours, such that each sub-pixel of the white colour is positioned adjacent to at least one sub-pixel of a different colour. As shown, at least 50 percent of the sub-pixels in a given pixel have a parallelogram-like shape. It will also be appreciated that an example arrangement of the sub-pixels of the primary colours R, G and B and the colour W has been shown for illustration purposes only; there is other alternative arrangements of the sub-pixels.

It may be understood by a person skilled in the art that FIG. 6 merely depicts an example implementation of the given pixels 600, for sake of clarity, which should not unduly limit the scope of the claims herein. It is to be understood that the specific implementation of the given pixels 600 is not to be construed as limiting it to specific numbers, shapes or colours of sub-pixels. The person skilled in the art will recognize many variations, alternatives and modifications of embodiments of the present disclosure.

Figure 7:
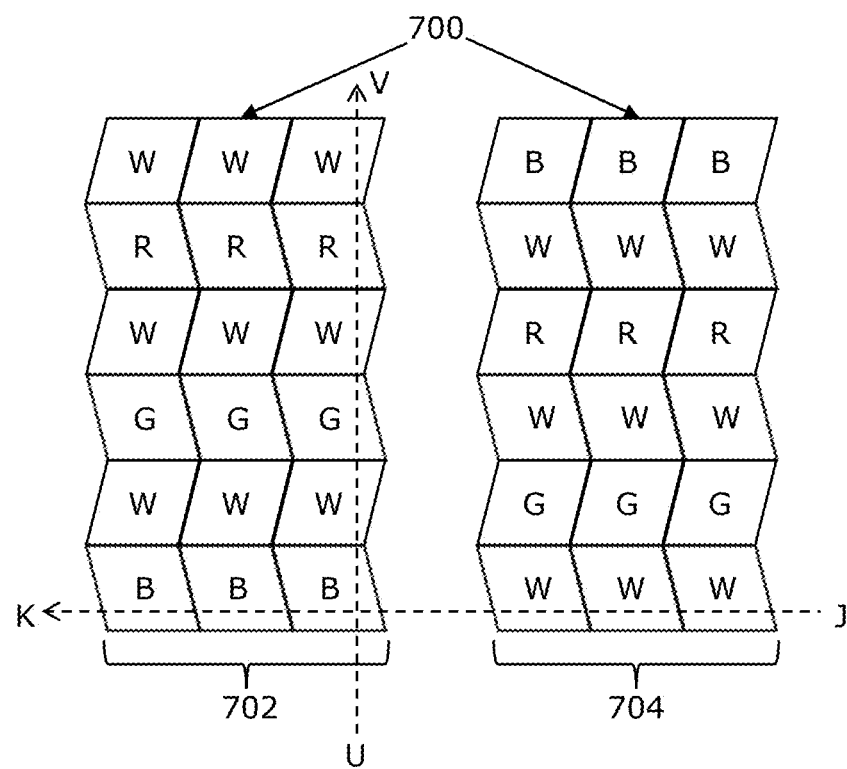

FIG. 7 shows given pixels 700 for each of a left eye and right eye of a viewer, in accordance with an embodiment of the present disclosure. The given pixels 700 comprise pixels 702 for the left eye of the viewer and pixels 704 for the right eye of the viewer. Moreover, each pixel of from among the pixels 702 for the left eye of the viewer and from among the pixels 704 for the right eye of the viewer comprises sub-pixels associated with at least two different colours, W, R, G and B. As shown, a coloured sub-pixel R, G or B is arranged for the right eye of the viewer in the pixel 704 corresponding to every white sub-pixel W for the left eye of the viewer in the pixel 702 and vice versa. As shown, at least 50 percent of the sub-pixels in a given pixel 700 have a parallelogram-like shape and a coloured sub-pixel R, G or B has been arranged in the pixels 704 for each white sub-pixel W in the pixels 702 and vice versa. Thus, a first half of a given lenticular lens lies on an optical path of a first set of pixels (such as the pixels 702), while a second half of the given lenticular lens lies on an optical path of a second set of pixels (such as the pixels 704), wherein a sub-pixel belonging to a given pixel of the first set of pixels 702 and a sub-pixel belonging to a corresponding pixel of the second set of pixels 704, arranged on a same scanline J-K perpendicular to the first direction U-V, have different colours. It will also be appreciated that an example arrangement of the sub-pixels of the primary colours R, G and B and the colour W has been shown for illustration purposes only; there is other alternative arrangements of the sub-pixels.

It may be understood by a person skilled in the art that FIG. 7 merely depicts an example implementation of the given pixels 700, for sake of clarity, which should not unduly limit the scope of the claims herein. It is to be understood that the specific implementation of the given pixels 700 is not to be construed as limiting it to specific numbers, shapes or colours of sub-pixels. The person skilled in the art will recognize many variations, alternatives and modifications of embodiments of the present disclosure.

Figure 8:
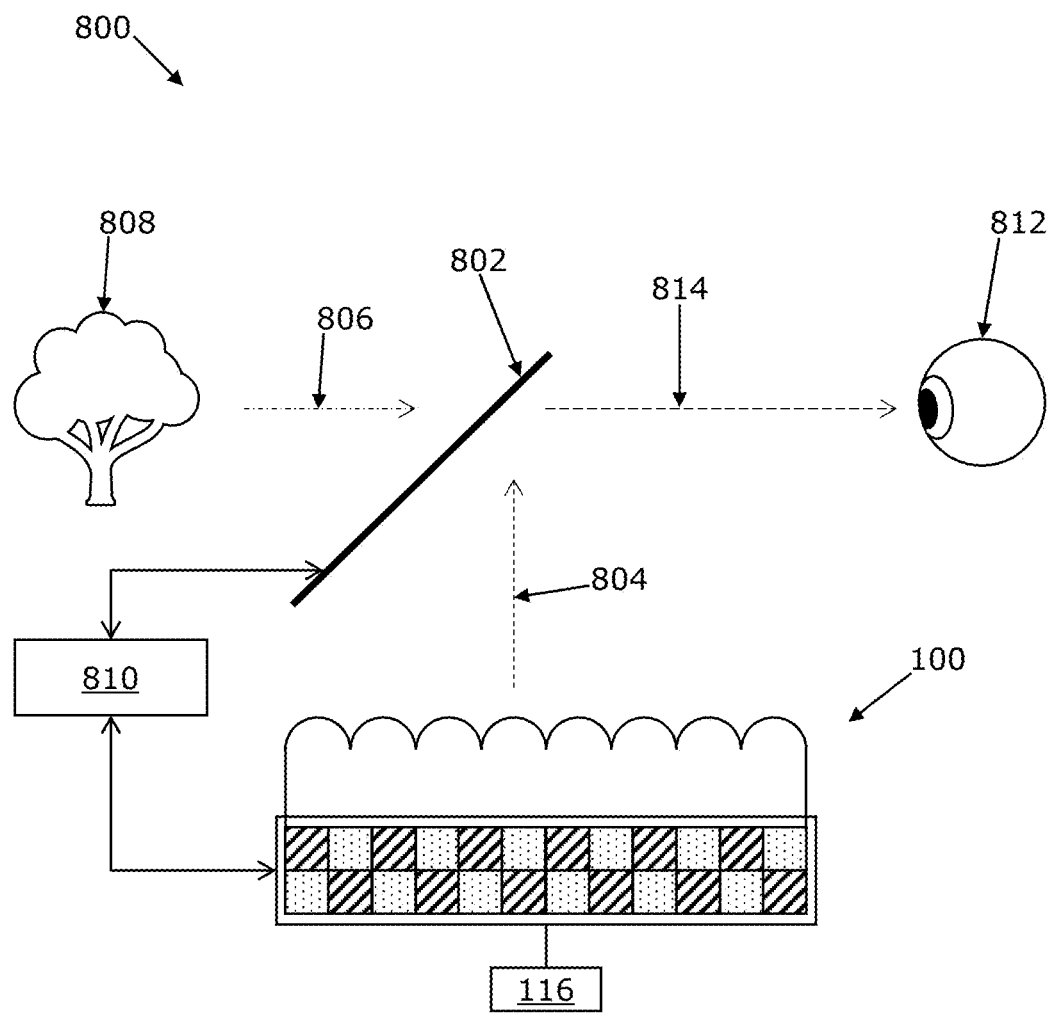
FIG. 8 shows a simplified top view of a system, in accordance with an embodiment of the present disclosure.

FIG. 8 shows a simplified top view of a system 800, in accordance with an embodiment of the present disclosure. The system 800 comprises the display device 100 of FIG. 1 and an optical combiner 802 arranged on an optical path 804 of the display device 100 and on an optical path 806 of a real-world light field of a real-world environment 808. The system 800 further comprises at least one processor 810 configured to:

generate or retrieve a light field image to be displayed via the display device 100; and send the light field image to the display device 100, wherein the display device 100 is employed to display the light field image for producing a synthetic light field and wherein the optical combiner 802 is employed to reflect the synthetic light field 814 towards eyes 812 of at least one user, whilst optically combining the real-world light field with the synthetic light field 814.

The invention claimed is:

1. A display device comprising:
    a light-emitting panel comprising a plurality of pixels, wherein a given pixel comprises sub-pixels of at least two different colours that are arranged sequentially along a first direction;
    a lenticular array arranged on an optical path of the light-emitting panel, the lenticular array comprising a plurality of lenticular lenses, wherein a longitudinal axis of a given lenticular lens aligns with the first direction; and
    at least one processor configured to:
        generate drive signals for the plurality of pixels, based on a light field image to be displayed; and
        drive the plurality of pixels using the drive signals to display the light field image.

2. The display device of claim 1, wherein a length of a given sub-pixel in a second direction is larger than a breadth of the given sub-pixel in the first direction, the second direction being perpendicular to the first direction.

3. The display device of claim 1, wherein the at least two different colours include a red colour, a green colour and a white colour and optionally, a blue colour.

4. The display device of claim 3, wherein in the given pixel, individual ones of sub-pixels of the white colour are interspersed among sub-pixels of remaining colours, such that each sub-pixel of the white colour is positioned adjacent to at least one sub-pixel of a different colour.

5. The display device of claim 4, wherein in the given pixel, a number of the sub-pixels of the white colour is same as a number of the sub-pixels of the remaining colours.

6. The display device of claim 1, wherein for a given lenticular lens, sub-pixels that are arranged on a same scanline perpendicular to the first direction and belong to pixels on whose optical path the given lenticular lens lies, have a same colour.

7. The display device of claim 1, wherein for a given lenticular lens, sub-pixels belonging to pixels on whose optical path a first half of the given lenticular lens lies and sub-pixels belonging to pixels on whose optical path a second half of the given lenticular lens lies, arranged on a same scanline perpendicular to the first direction, have different colours.

8. The display device of claim 1, wherein a first half of a given lenticular lens lies on an optical path of a first set of pixels, while a second half of the given lenticular lens lies on an optical path of a second set of pixels, wherein a sub-pixel belonging to a given pixel of the first set and a sub-pixel belonging to a corresponding pixel of the second set, arranged on a same scanline perpendicular to the first direction, have different colours.

9. The display device of claim 1, wherein at least 50 percent of the sub-pixels in the given pixel have a parallelogram-like shape.

10. The display device of claim 9, wherein in the given pixel an orientation of a parallelogram-like shape of a given sub-pixel is opposite to an orientation of a parallelogram-like shape of another sub-pixel adjacent to the given sub-pixel.

11. The display device of claim 1, wherein the given lenticular lens lies on an optical path of N pixels, wherein N lies in a range of 5 to 18.

12. A system comprising:
- a display device of claim 1;
- an optical combiner arranged on an optical path of the display device and on an optical path of a real-world light field of a real-world environment; and
- at least one processor configured to:
  - generate or retrieve a light field image to be displayed via the display device; and
  - send the light field image to the display device,
- wherein the display device is employed to display the light field image for producing a synthetic light field and wherein the optical combiner is employed to reflect the synthetic light field towards eyes of at least one user, whilst optically combining the real-world light field with the synthetic light field.

13. The system of claim 12, further comprising a tracker, wherein the at least one processor is configured to determine a relative location of a first eye and of a second eye of the at least one user with respect to the optical combiner, by utilising the tracker,
- wherein the light field image is generated or retrieved based on the relative location of the first eye and of the second eye of the at least one user with respect to the optical combiner.

14. The system of claim 13, wherein the plurality of lenticular lenses are individually controllable and wherein the at least one processor is configured to:
- control a shape of a given lenticular lens of the lenticular array, based on the relative location of the first eye and of the second eye of the at least one user with respect to the optical combiner, to direct light rays corresponding to a first set of pixels of the light field image and light rays corresponding to a second set of pixels of the light field image to produce a first part and a second part of the synthetic light field, respectively, for the first eye and the second eye of the at least one user.

* * * * *